US012762283B2

(12) United States Patent
Speasl et al.

(10) Patent No.: US 12,762,283 B2
(45) Date of Patent: Oct. 13, 2026

(54) SECURE DIGITAL DATA COLLECTION

(71) Applicant: ImageKeeper LLC, Las Vegas, NV (US)

(72) Inventors: Jerry Speasl, Las Vegas, NV (US); Marc Roberts, St. Louis, MO (US); Mike Patterson, Sherman, TX (US)

(73) Assignee: ImageKeeper LLC, Las Vegas, NV (US)

( * ) Notice: Subject to any disclaimer, the term of this patent is extended or adjusted under 35 U.S.C. 154(b) by 212 days.

(21) Appl. No.: 18/785,843

(22) Filed: Jul. 26, 2024

(65) Prior Publication Data

US 2024/0386144 A1 Nov. 21, 2024

Related U.S. Application Data

(63) Continuation of application No. 18/094,519, filed on Jan. 9, 2023, now Pat. No. 12,216,802, which is a (Continued)

(51) Int. Cl.
*G06F 21/64* (2013.01)
*H04L 9/32* (2006.01)
*H04N 21/60* (2011.01)

(52) U.S. Cl.
CPC ............ *G06F 21/64* (2013.01); *H04L 9/3247* (2013.01); *H04N 21/60* (2013.01)

(58) Field of Classification Search
CPC ..... G06F 21/64; H04L 9/3247; H04L 9/3297; H04N 21/60; H04N 21/2351; H04N 21/26613; H04N 21/835
See application file for complete search history.

(56) References Cited

U.S. PATENT DOCUMENTS 4,876,597 A 10/1989 Roy et al.
5,343,527 A 8/1994 Moore
(Continued)

FOREIGN PATENT DOCUMENTS

| | | |
|---|---|---|
| CN | 101529797 | 9/2009 |
| CN | 108040050 | 5/2018 |
| CN | 109460732 | 3/2019 |
| CN | 110866224 | 3/2020 |
| WO | WO 2016/028933 | 2/2016 |
| WO | WO 2020/010355 | 1/2020 |

OTHER PUBLICATIONS

Friedman, "The Trustworthy Digital Camera: Restoring Credibility to the Photographic Image", IEEE Transactions on Consumer Electronics, 39(4): 430-435, 1993.
(Continued)

*Primary Examiner* — Lin Ye
*Assistant Examiner* — Tuan H Le
(74) *Attorney, Agent, or Firm* — Polsinelli LLP

(57) ABSTRACT

Systems and methods for generating certified images and incident reports are disclosed. An image capture device can be used to capture an image and integrate metadata from camera sensors as well as other ancillary device sensors into the image. The image and its metadata can then be certified upon a check that the image and its metadata are authentic and unaltered. The image and its metadata can then be included in or as a part of an incident or other report describing an incident or event such as an accident or a crime. The image and/or incident report may be maintained at a cloud-based server for viewing, authorized editing, and subsequent distribution.

24 Claims, 15 Drawing Sheets

Related U.S. Application Data continuation of application No. 17/475,847, filed on Sep. 15, 2021, now Pat. No. 11,550,960, which is a continuation of application No. 17/162,629, filed on Jan. 29, 2021, now Pat. No. 11,227,070, which is a continuation of application No. 16/399,785, filed on Apr. 30, 2019, now abandoned, which is a continuation of application No. 15/052,774, filed on Feb. 24, 2016, now Pat. No. 10,282,562.

(60) Provisional application No. 62/119,951, filed on Feb. 24, 2015.

(56) References Cited

U.S. PATENT DOCUMENTS 5,553,609 A 9/1996 Chen et al.
5,606,609 A 2/1997 Houser et al.
5,737,491 A 4/1998 Allen et al.
6,038,295 A 3/2000 Mattes
6,122,526 A 9/2000 Parulski et al.
6,182,219 B1 1/2001 Feldbau et al.
6,256,059 B1 7/2001 Fichtner
6,278,466 B1 8/2001 Chen et al.
6,304,211 B1 10/2001 Boman
6,370,568 B1 4/2002 Garfinkle
6,401,206 B1 6/2002 Khan et al.
6,584,564 B2 6/2003 Olkin et al.
6,662,226 B1 12/2003 Wang et al.
6,751,454 B2 6/2004 Thornton
6,784,925 B1 8/2004 Tomat et al.
6,847,334 B2 1/2005 Hayhurst et al.
6,948,069 B1 9/2005 Teppler
6,995,789 B2 2/2006 Mcintyre et al.
7,028,184 B2 4/2006 Hind et al.
7,034,880 B1 4/2006 Endsley et al.
7,170,551 B2 1/2007 Fichtner
7,188,307 B2 3/2007 Ohsawa
7,239,346 B1 7/2007 Priddy
7,251,343 B2 7/2007 Dorrell et al.
7,343,049 B2 3/2008 Bulterworth
7,526,718 B2 4/2009 Samadani et al.
7,934,098 B1 4/2011 Han et al.
8,224,178 B2 7/2012 Keane
8,634,712 B1 1/2014 Mullins
9,094,543 B2 7/2015 Mullins
9,300,678 B1 3/2016 Stack et al.
9,533,769 B1 1/2017 Kirtz et al.
9,538,336 B2 1/2017 Rudow et al.
9,836,793 B2 12/2017 Busque et al.
10,048,378 B2 8/2018 Gogolla et al.
10,101,465 B2 10/2018 Loomis et al.
10,282,562 B1 5/2019 Speasl et al.
10,304,137 B1 5/2019 Genser et al.
10,318,110 B2 6/2019 Naaman et al.
10,360,705 B2 7/2019 Cervelli et al.
10,430,886 B1 10/2019 Brandmaier et al.
10,444,941 B2 10/2019 Cervelli et al.
10,497,250 B1 12/2019 Hayward et al.
10,726,098 B2* 7/2020 Brama ................. G06Q 20/065
10,791,265 B1 9/2020 Lambert et al.
10,949,814 B1 3/2021 Nelson et al.
10,956,879 B1 3/2021 Eidson et al.
10,991,049 B1 4/2021 Devereaux et al.
11,004,187 B2 5/2021 Kuruvilla et al.
11,146,381 B2 10/2021 Miller et al.
RE48,867 E 12/2021 Schneider
11,212,416 B2 12/2021 Speasl et al.
11,227,070 B2 1/2022 Speasl et al.
11,379,886 B1 7/2022 Fields et al.
11,468,198 B2 10/2022 Speasl et al.
11,481,854 B1 10/2022 Speasl et al.
11,550,960 B2 1/2023 Speasl et al.
11,553,105 B2 1/2023 Speasl et al.
11,741,219 B2 8/2023 Zeng et al.
11,838,475 B2 12/2023 Speasl et al.
11,861,721 B1 1/2024 Tye et al.
12,106,391 B2 10/2024 Speasl et al.
12,212,725 B2 1/2025 Speasl et al.
12,216,802 B2 2/2025 Speasl et al.
12,585,830 B2 3/2026 Speasl et al.
2002/0108118 A1 8/2002 Cohen et al.
2002/0122568 A1 9/2002 Zhao
2002/0147618 A1 10/2002 Mezrah et al.
2002/0186412 A1 12/2002 Murashita
2003/0085989 A1 5/2003 Tay
2003/0126432 A1 7/2003 Tonisson
2004/0012811 A1 1/2004 Nakayama
2004/0125208 A1* 7/2004 Malone ................. H04L 9/0643 348/207.1
2004/0174434 A1 9/2004 Walker et al.
2004/0217884 A1 11/2004 Samadani et al.
2004/0218894 A1 11/2004 Harville et al.
2004/0218895 A1 11/2004 Samadani et al.
2004/0218910 A1 11/2004 Chang et al.
2004/0221227 A1 11/2004 Wu
2004/0264542 A1 12/2004 Kientz
2005/0036034 A1 2/2005 Rea et al.
2005/0062851 A1 3/2005 Silverbrook et al.
2005/0110880 A1 5/2005 Parulski et al.
2005/0114459 A1 5/2005 Tu et al.
2005/0288939 A1 12/2005 Peled et al.
2006/0036864 A1 2/2006 Parulski et al.
2006/0105806 A1 5/2006 Vance et al.
2006/0114338 A1 6/2006 Rothschild
2006/0248348 A1 11/2006 Wakao et al.
2007/0008321 A1 1/2007 Gallagher et al.
2007/0063033 A1 3/2007 Silverbrook et al.
2007/0073937 A1 3/2007 Feinberg et al.
2007/0074035 A1 3/2007 Scanlon et al.
2008/0204317 A1 8/2008 Schreve et al.
2008/0219658 A1 9/2008 Keane et al.
2008/0304669 A1 12/2008 Bugbee
2008/0305856 A1 12/2008 Walker et al.
2009/0031425 A1 1/2009 Basson et al.
2009/0279734 A1 11/2009 Brown
2011/0137561 A1 6/2011 Kankainen
2011/0231645 A1 9/2011 Thomas et al.
2011/0235923 A1 9/2011 Weisenburger et al.
2011/0276423 A1 11/2011 Davidson
2012/0086971 A1 4/2012 Bisbee et al.
2012/0166806 A1 6/2012 Zhang et al.
2012/0275651 A1 11/2012 Brown
2013/0046461 A1 2/2013 Balloga
2013/0080051 A1 3/2013 Gribkov et al.
2014/0049653 A1 2/2014 Leonard et al.
2014/0114691 A1 4/2014 Pearce
2014/0125822 A1 5/2014 Mullins
2014/0143545 A1 5/2014 McKeeman et al.
2014/0152854 A1 6/2014 Iwaki et al.
2014/0176733 A1 6/2014 Drooker et al.
2014/0229395 A1 8/2014 Singer et al.
2014/0281520 A1 9/2014 Selgas et al.
2014/0300722 A1 10/2014 Garcia
2014/0304184 A1 10/2014 Fletcher
2015/0033305 A1 1/2015 Shear et al.
2015/0098021 A1 4/2015 O'Sullivan et al.
2015/0304300 A1 10/2015 Bender
2015/0312227 A1 10/2015 Follis et al.
2015/0317368 A1 11/2015 Rhoads et al.
2015/0334257 A1* 11/2015 Woods ............... H04N 1/00307 348/207.1
2016/0042767 A1 2/2016 Araya et al.
2016/0070892 A1* 3/2016 Leonard ........... H04N 21/63775 726/26
2016/0138919 A1 5/2016 Green et al.
2016/0169856 A1 6/2016 Sung
2016/0171622 A1 6/2016 Perkins et al.
2016/0182237 A1 6/2016 Almgren
2016/0210734 A1 7/2016 Kass et al.
2017/0063551 A1 3/2017 Quinn et al.
2017/0140492 A1 5/2017 Leonard et al.
2017/0293894 A1 10/2017 Taliwal et al.
2018/0082378 A1 3/2018 Kelsh et al.

(56) References Cited

U.S. PATENT DOCUMENTS

| | | | |
|---|---|---|---|
| 2018/0089776 | A1 | 3/2018 | Ahroon |
| 2018/0293552 | A1 | 10/2018 | Zhang et al. |
| 2018/0343505 | A1 | 11/2018 | Loheide et al. |
| 2018/0357632 | A1 | 12/2018 | Jammikunta et al. |
| 2019/0073641 | A1 | 3/2019 | Utke |
| 2019/0097812 | A1 * | 3/2019 | Toth ...................... H04L 9/0841 |
| 2019/0318348 | A1 | 10/2019 | Brenner et al. |
| 2019/0325164 | A1 | 10/2019 | Speasl et al. |
| 2019/0391972 | A1 | 12/2019 | Bates et al. |
| 2020/0014816 | A1 | 1/2020 | Speasl et al. |
| 2020/0151363 | A1 | 5/2020 | Speasl et al. |
| 2020/0184465 | A1 | 6/2020 | Kislev et al. |
| 2020/0226734 | A1 | 7/2020 | Kumar et al. |
| 2020/0349541 | A1 | 11/2020 | Gaddis et al. |
| 2020/0403796 | A1 | 12/2020 | Sapena Soler |
| 2021/0150066 | A1 | 5/2021 | Speasl et al. |
| 2021/0192629 | A1 | 6/2021 | Tofte et al. |
| 2021/0312561 | A1 | 10/2021 | Speasl et al. |
| 2021/0400161 | A1 | 12/2021 | Alrahaili |
| 2022/0004666 | A1 | 1/2022 | Speasl et al. |
| 2022/0070330 | A1 | 3/2022 | Speasl et al. |
| 2022/0078522 | A1 | 3/2022 | Zeng et al. |
| 2022/0116511 | A1 | 4/2022 | Speasl et al. |
| 2023/0161914 | A1 | 5/2023 | Speasl et al. |
| 2023/0281344 | A1 | 9/2023 | Speasl et al. |
| 2023/0281737 | A1 | 9/2023 | Speasl et al. |
| 2023/0291856 | A1 | 9/2023 | Speasl et al. |
| 2023/0342855 | A1 | 10/2023 | Sanchez et al. |
| 2023/0351011 | A1 | 11/2023 | Zeng et al. |
| 2024/0187539 | A1 | 6/2024 | Speasl et al. |
| 2024/0386142 | A1 | 11/2024 | Speasl et al. |
| 2024/0386143 | A1 | 11/2024 | Speasl et al. |
| 2026/0006144 | A1 | 1/2026 | Speasl et al. |

OTHER PUBLICATIONS

Collomosse et al., "To Authenticity and Beyond! Building Safe and Fair Generative AI upon the Three Pillars of Provenance," IEEE Computer Society, pp. 1-9, May/ Jun. 2024.

Earnshaw, et al., "Fighting Misinformation with Authenticated C2PA Provenance Metadata," Proceedings of the 2023 NAB Broadcast Engineering and Information Technology (BEIT) Conference, 2023.

PCT Application No. PCT/US2019/040852 International Preliminary Report on Patentability dated Jan. 12, 2021.

PCT Application No. PCT/US2019/040852 International Search Report and Written Opinion dated Oct. 22, 2019.

U.S. Appl. No. 15/051,569 Final Office Action dated Mar. 2, 2022.

U.S. Appl. No. 15/051,569 Office Action dated Aug. 27, 2021.

U.S. Appl. No. 15/051,569 Final Office Action dated Oct. 20, 2020.

U.S. Appl. No. 15/051,569 Office Action dated Apr. 29, 2020.

U.S. Appl. No. 15/051,569 Final Office Action dated Aug. 14, 2019.

U.S. Appl. No. 15/051,569 Office Action dated Feb. 8, 2019.

U.S. Appl. No. 17/967,554 Office Action dated Sep. 26, 2023.

U.S. Appl. No. 15/052,774 Final Office Action dated Jun. 1, 2018.

U.S. Appl. No. 15/052,774 Office Action dated Aug. 7, 2017.

U.S. Appl. No. 16/399,785 Final Office Action dated Nov. 6, 2020.

U.S. Appl. No. 16/399,785 Office Action dated Aug. 9, 2019.

U.S. Appl. No. 16/741,605 Final Office Action dated Jul. 24, 2020.

U.S. Appl. No. 16/741,605 Office Action dated Mar. 20, 2020.

U.S. Appl. No. 17/162,629 Office Action dated Oct. 18, 2021.

U.S. Appl. No. 11/715,049 Office Action dated Dec. 14, 2011.

U.S. Appl. No. 11/715,049 Final Office Action dated Jul. 8, 2011.

U.S. Appl. No. 11/715,049 Office Action dated Jun. 12, 2009.

U.S. Appl. No. 13/491,026 Office Action dated Mar. 5, 2013.

U.S. Appl. No. 14/154,156 Office Action dated Feb. 28, 2014.

U.S. Appl. No. 14/809,068 Office Action dated Dec. 18, 2015.

U.S. Appl. No. 16/505,305 Office Action dated Mar. 3, 2021.

U.S. Appl. No. 16/505,305 Final Office Action dated Nov. 17, 2020.

U.S. Appl. No. 16/505,305 Office Action dated Jul. 22, 2020.

U.S. Appl. No. 17/556,071 Office Action dated Sep. 26, 2022.

U.S. Appl. No. 17/556,071 Final Office Action dated Jun. 1, 2023.

U.S. Appl. No. 17/008,568 Office Action dated Mar. 9, 2022.

U.S. Appl. No. 17/962,242 Office Action dated Oct. 1, 2024.

U.S. Appl. No. 18/786,090, filed Jul. 26, 2024, Jerry Speasl, Property Measurement With Automated Document Production.

U.S. Appl. No. 18/785,787, filed Jul. 26, 2024, Jerry Speasl, Secure Digital Data Collection.

U.S. Appl. No. 18/785,812, filed Jul. 26, 2024, Jerry Speasl, Secure Digital Data Collection.

* cited by examiner

Figure 8:
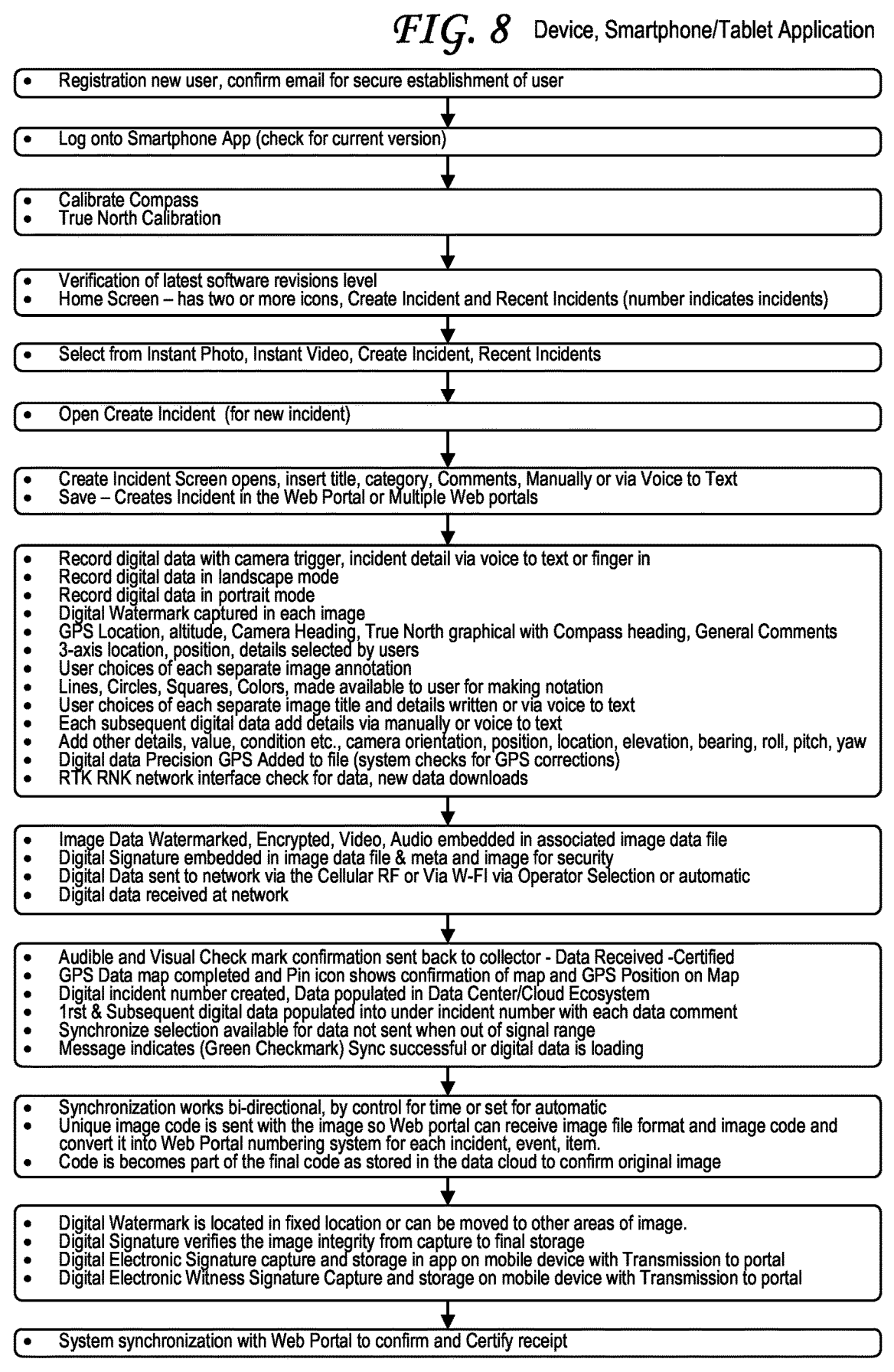

FIG. 8 Device, Smartphone/Tablet Application

- Registration new user, confirm email for secure establishment of user

↓

- Log onto Smartphone App (check for current version)

↓

- Calibrate Compass
- True North Calibration

↓

- Verification of latest software revisions level
- Home Screen – has two or more icons, Create Incident and Recent Incidents (number indicates incidents)

↓

- Select from Instant Photo, Instant Video, Create Incident, Recent Incidents

↓

- Open Create Incident (for new incident)

↓

- Create Incident Screen opens, insert title, category, Comments, Manually or via Voice to Text
- Save – Creates Incident in the Web Portal or Multiple Web portals

↓

- Record digital data with camera trigger, incident detail via voice to text or finger in
- Record digital data in landscape mode
- Record digital data in portrait mode
- Digital Watermark captured in each image
- GPS Location, altitude, Camera Heading, True North graphical with Compass heading, General Comments
- 3-axis location, position, details selected by users
- User choices of each separate image annotation
- Lines, Circles, Squares, Colors, made available to user for making notation
- User choices of each separate image title and details written or via voice to text
- Each subsequent digital data add details via manually or voice to text
- Add other details, value, condition etc., camera orientation, position, location, elevation, bearing, roll, pitch, yaw
- Digital data Precision GPS Added to file (system checks for GPS corrections)
- RTK RNK network interface check for data, new data downloads

↓

- Image Data Watermarked, Encrypted, Video, Audio embedded in associated image data file
- Digital Signature embedded in image data file & meta and image for security
- Digital Data sent to network via the Cellular RF or Via W-FI via Operator Selection or automatic
- Digital data received at network

↓

- Audible and Visual Check mark confirmation sent back to collector - Data Received -Certified
- GPS Data map completed and Pin icon shows confirmation of map and GPS Position on Map
- Digital incident number created, Data populated in Data Center/Cloud Ecosystem
- 1rst & Subsequent digital data populated into under incident number with each data comment
- Synchronize selection available for data not sent when out of signal range
- Message indicates (Green Checkmark) Sync successful or digital data is loading

↓

- Synchronization works bi-directional, by control for time or set for automatic
- Unique image code is sent with the image so Web portal can receive image file format and image code and convert it into Web Portal numbering system for each incident, event, item.
- Code is becomes part of the final code as stored in the data cloud to confirm original image

↓

- Digital Watermark is located in fixed location or can be moved to other areas of image.
- Digital Signature verifies the image integrity from capture to final storage
- Digital Electronic Signature capture and storage in app on mobile device with Transmission to portal
- Digital Electronic Witness Signature Capture and storage on mobile device with Transmission to portal

↓

- System synchronization with Web Portal to confirm and Certify receipt

Figure 9A:
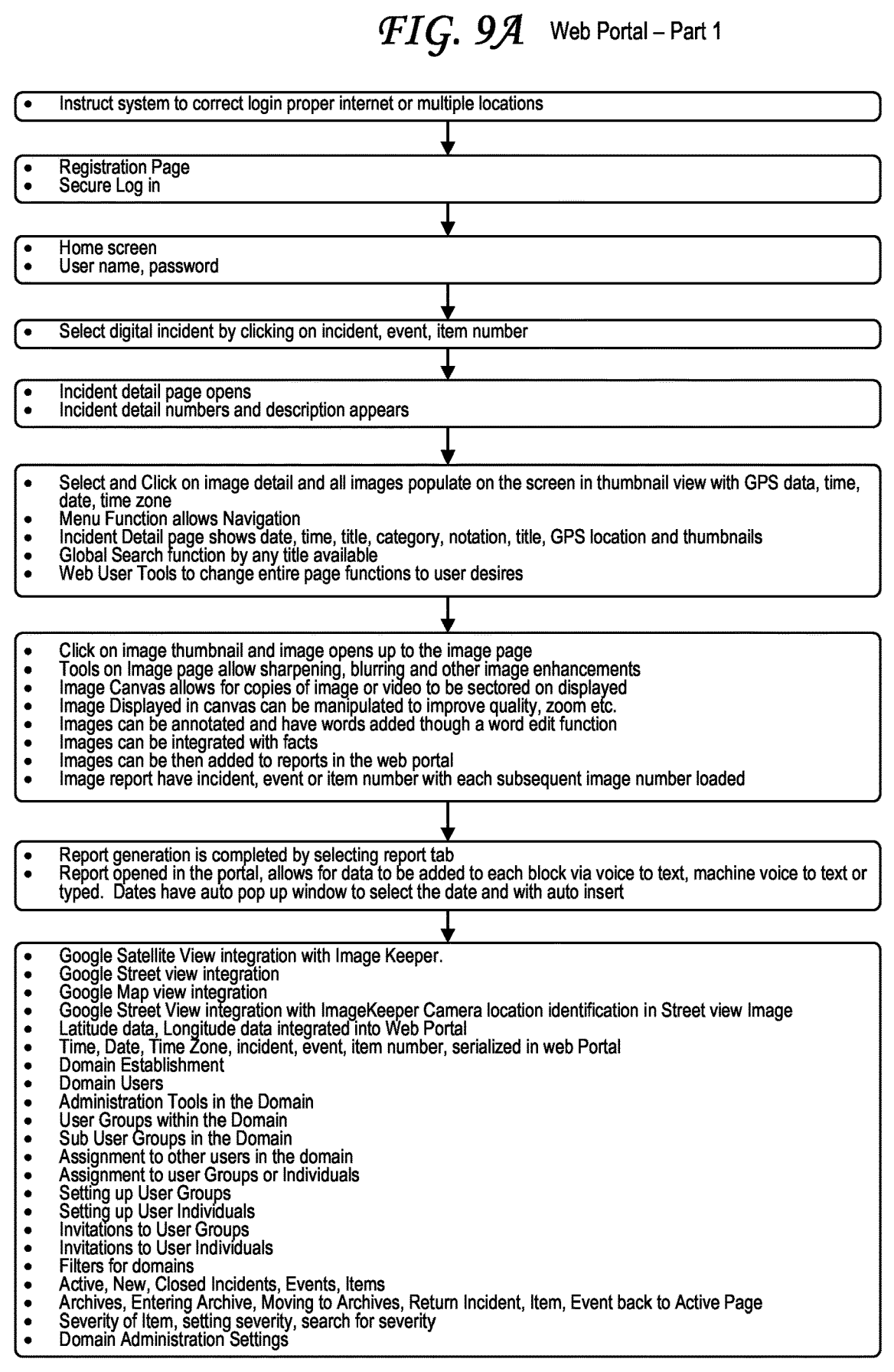

FIG. 9A Web Portal – Part 1

- Instruct system to correct login proper internet or multiple locations

↓

- Registration Page
- Secure Log in

↓

- Home screen
- User name, password

↓

- Select digital incident by clicking on incident, event, item number

↓

- Incident detail page opens
- Incident detail numbers and description appears

↓

- Select and Click on image detail and all images populate on the screen in thumbnail view with GPS data, time, date, time zone
- Menu Function allows Navigation
- Incident Detail page shows date, time, title, category, notation, title, GPS location and thumbnails
- Global Search function by any title available
- Web User Tools to change entire page functions to user desires

↓

- Click on image thumbnail and image opens up to the image page
- Tools on Image page allow sharpening, blurring and other image enhancements
- Image Canvas allows for copies of image or video to be sectored on displayed
- Image Displayed in canvas can be manipulated to improve quality, zoom etc.
- Images can be annotated and have words added though a word edit function
- Images can be integrated with facts
- Images can be then added to reports in the web portal
- Image report have incident, event or item number with each subsequent image number loaded

↓

- Report generation is completed by selecting report tab
- Report opened in the portal, allows for data to be added to each block via voice to text, machine voice to text or typed. Dates have auto pop up window to select the date and with auto insert

↓

- Google Satellite View integration with Image Keeper.
- Google Street view integration
- Google Map view integration
- Google Street View integration with ImageKeeper Camera location identification in Street view Image
- Latitude data, Longitude data integrated into Web Portal
- Time, Date, Time Zone, incident, event, item number, serialized in web Portal
- Domain Establishment
- Domain Users
- Administration Tools in the Domain
- User Groups within the Domain
- Sub User Groups in the Domain
- Assignment to other users in the domain
- Assignment to user Groups or Individuals
- Setting up User Groups
- Setting up User Individuals
- Invitations to User Groups
- Invitations to User Individuals
- Filters for domains
- Active, New, Closed Incidents, Events, Items
- Archives, Entering Archive, Moving to Archives, Return Incident, Item, Event back to Active Page
- Severity of Item, setting severity, search for severity
- Domain Administration Settings FIG. 9B Web Portal – Part 2

Figure 9B:
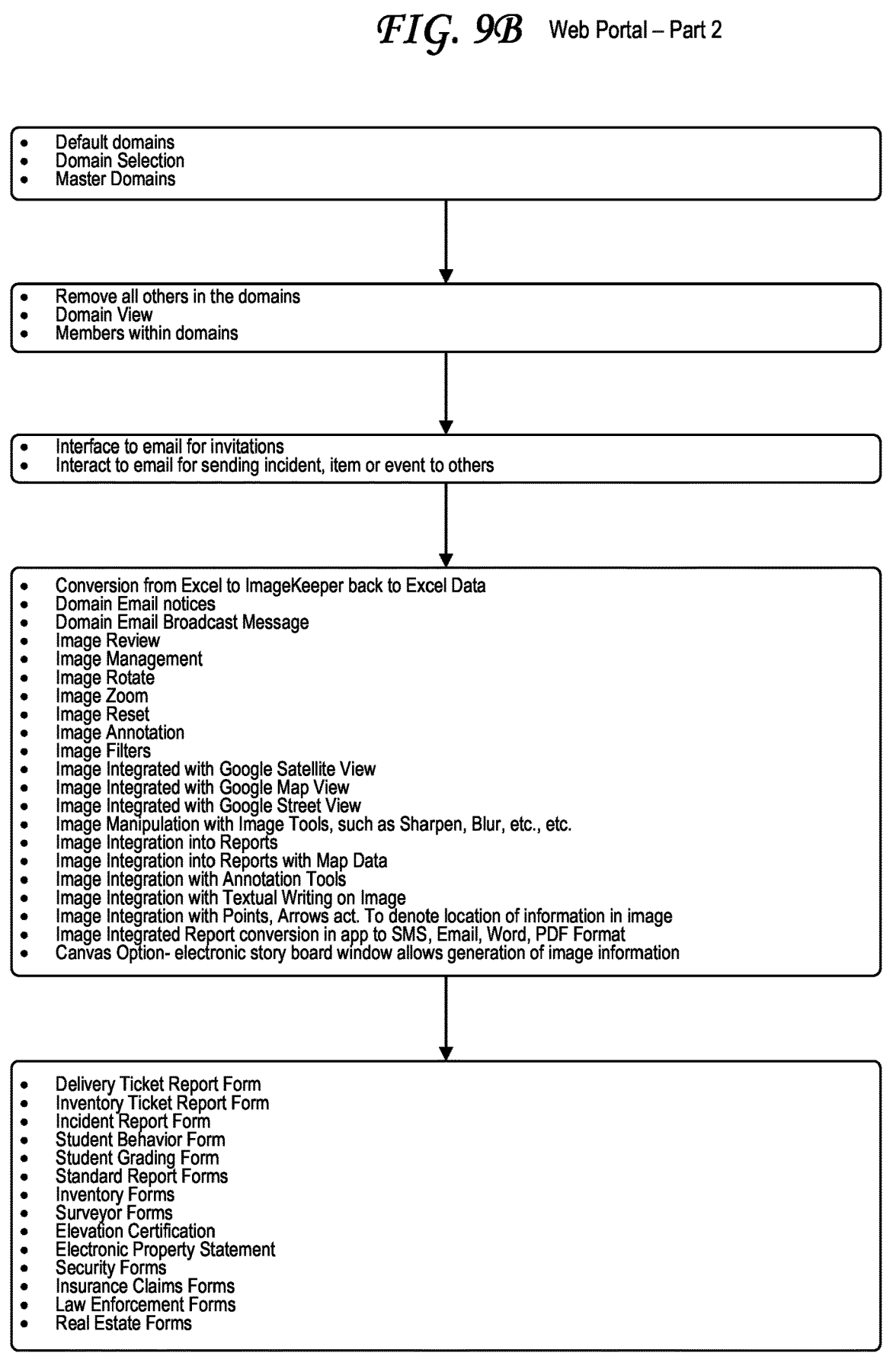

- Default domains
- Domain Selection
- Master Domains

↓

- Remove all others in the domains
- Domain View
- Members within domains

↓

- Interface to email for invitations
- Interact to email for sending incident, item or event to others

↓

- Conversion from Excel to ImageKeeper back to Excel Data
- Domain Email notices
- Domain Email Broadcast Message
- Image Review
- Image Management
- Image Rotate
- Image Zoom
- Image Reset
- Image Annotation
- Image Filters
- Image Integrated with Google Satellite View
- Image Integrated with Google Map View
- Image Integrated with Google Street View
- Image Manipulation with Image Tools, such as Sharpen, Blur, etc., etc.
- Image Integration into Reports
- Image Integration into Reports with Map Data
- Image Integration with Annotation Tools
- Image Integration with Textual Writing on Image
- Image Integration with Points, Arrows act. To denote location of information in image
- Image Integrated Report conversion in app to SMS, Email, Word, PDF Format
- Canvas Option- electronic story board window allows generation of image information

↓

- Delivery Ticket Report Form
- Inventory Ticket Report Form
- Incident Report Form
- Student Behavior Form
- Student Grading Form
- Standard Report Forms
- Inventory Forms
- Surveyor Forms
- Elevation Certification
- Electronic Property Statement
- Security Forms
- Insurance Claims Forms
- Law Enforcement Forms
- Real Estate Forms

*FIG. 11*

Incident Report

105226-100372
Date of Incident – 2/21/2014 7:54:43 AM

ImageKeeper

| | | | |
|---|---|---|---|
| **First Name:** | Fred | **Last Name:** | Summer |
| **Email:** | summer@winter.com | **Phone:** | 782 098 8876 |
| **Address:** | 421 Winter Street | **City:** | Las Vegas |
| **State:** | NV | **Zip Code:** | 89109 |

Report Description

On the sixth of March, I was in New Orleans and spent time taking images to utilize in this report.

On the morning of March 6 I was on the balcony of the Omni Hotel on 412 Royal Street, New Orleans, LA. I took the following images to show how the user would see the images with and without a telephoto lens that fits on the iPhone.

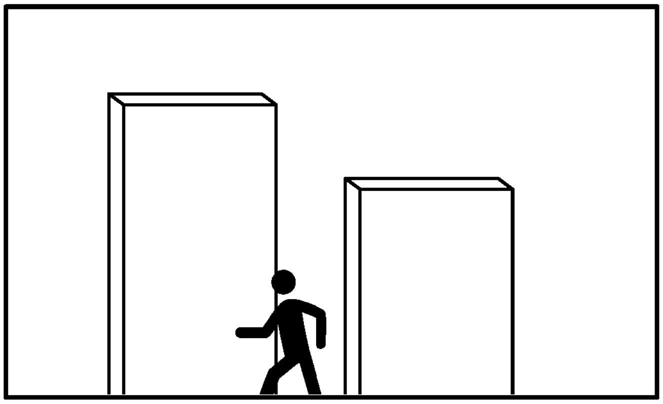

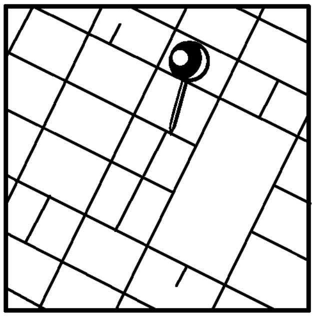

2/25/2014 11:08:17 AM

ImageKeeper Incident Report 1

SECURE DIGITAL DATA COLLECTION

CROSS-REFERENCE TO RELATED APPLICATION

The present application is a continuation and claims the priority benefit of U.S. patent application Ser. No. 18/094,519 filed Jan. 9, 2023, which is a continuation of and claims priority benefit of U.S. patent application Ser. No. 17/475,847 filed Sep. 15, 2021, now U.S. Pat. No. 11,550,960, which is a continuation and claims the priority benefit of U.S. patent application Ser. No. 17/162,629 filed Jan. 29, 2021, now U.S. Pat. No. 11,227,070, which is a continuation and claims the priority benefit of U.S. patent application Ser. No. 16/399,785 filed Apr. 30, 2019, which is a continuation and claims the priority benefit of U.S. patent application Ser. No. 15/052,774, filed Feb. 24, 2016, now U.S. Pat. No. 10,282,562, which claims the priority benefit of U.S. provisional application No. 62/119,951 filed Feb. 24, 2015, the disclosures of which are hereby incorporated by reference.

BACKGROUND

Field of the Invention

The present invention generally relates to digital imaging. More specifically, the present invention relates to certification of digital images captured by electronic devices.

Description of the Related Art

User devices such as smartphones or tablets can take photos using camera software applications designed to interact with camera hardware embedded in the user device. Some of these camera applications store photo metadata along with the photo. Examples of metadata include the identity the user device from which the photo was taken, latitude and longitude at which the photo was taken, and information concerning use of filters or other applications that may alter the digital image. The type, format, and details of such metadata are incomplete and inconsistent between camera software applications. A user of one software application cannot rely on a specific set of metadata to be present along with the same photograph should it be taken in another application.

Some types of positional, sensor, and other software or hardware data, while available for use, are often not stored as photo metadata or in a manner that allows for pairing of the data with a particular image. This data could be used in the context of other software applications or in the review of certain photographs. As a result, users may not be able to determine the exact positioning of a user device, an object being photographed, or the output of other sensors while or when the photo was being taken.

Photographs are also often used in creating an incident report. Creating an incident report usually involves transcribing details of an incident details such as a car accident or structural damage to a home from personal or third-party observation to handwritten form. Those handwritten notes are then entered into a computer or program operating thereon. Photographs related to the incident and showing the accident or damage are usually scanned or uploaded into the aforementioned computer or program by way of a physical or network connection.

Traditionally, these images would have be—as a matter of course and necessity—accepted at face value with no reliable way to ascertain if the images were authentic or unaltered. The transcribed information such as the location and physics of an incident, too, were not always accurate due to human transcription or data entry error or a misreading of image data.

There is a need in the art to more completely collect available sources of metadata as they pertain to digital imagery—both still and moving. Further, there is a need in the art to better correlate such metadata to files or documents that may be associated with a digital image. Finally, there is a need in the art to be able to verify the accuracy of a digital image, the metadata therein, as well as any data that might be based on, related to, or otherwise derived from that image.

SUMMARY OF THE PRESENTLY CLAIMED INVENTION

In a first claimed embodiment of the present invention, a method for generating an incident report is disclosed. Through the claimed method, a digital image is received. Sensor data associated with the image is also received. A determination is then made with respect to the authenticity and unaltered nature of the digital image and the sensor data. A determination is also made that the sensor data includes at least a predetermined set of sensor readings. A certified image is then created by digitally joining the image with one or more of the sensor data or a subset thereof. A description of an incident is then received from which an incident report is generated said report including the certified image. The incident report is then provided to a network based server for subsequent management.

BRIEF DESCRIPTION OF THE DRAWINGS

FIG. 8 is a flow diagram illustrating an exemplary operation of a user device software application for image capture, image certification, network transfer, and incident reporting.

FIG. 9A is a first half of a flow diagram illustrating an exemplary operation of web portal software.

FIG. 9B is a second half of a flow diagram illustrating an exemplary operation of web portal software.

FIG. 11 is an exemplary incident report document with an integrated image and location map indicating where the image was taken

DETAILED DESCRIPTION

Systems and methods for generating certified images and incident reports are disclosed. An image capture device can be used to capture an image and integrate metadata from camera sensors as well as other ancillary device sensors into the image. The image and its metadata can then be certified upon a check that the image and its metadata are authentic and unaltered. The image and its metadata can then be included in or as a part of an incident or other report describing an incident or event such as an accident or a crime. The image and/or incident report may be maintained at a cloud-based server for viewing, authorized editing, and subsequent distribution.

Figure 1:
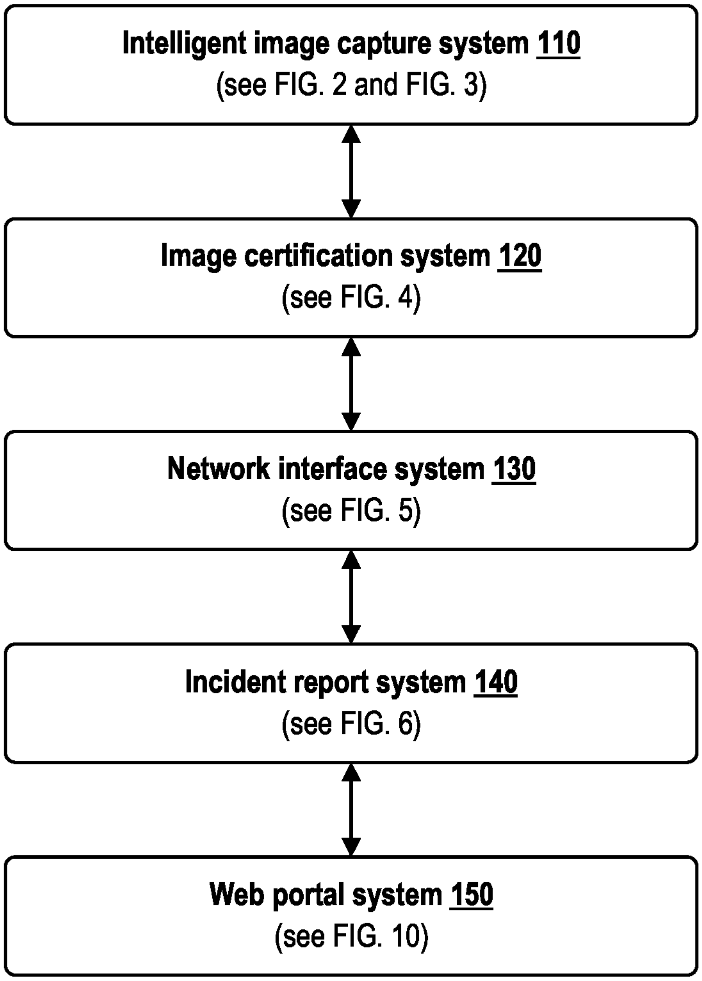
FIG. 1 illustrates an image capture and certification system combined with an incident reporting system.

FIG. 1 illustrates an image capture and certification system combined with an incident reporting system. The system of FIG. 1 includes an image capture system 110 that is described further in FIG. 2 and FIG. 3, an image certification system 120 that is described further in FIG. 4, a network interface system 130 that is described further in FIG. 5, an incident report system 140 that is described further in FIG. 6, and a web portal system 150 that is described further in FIG. 10. Specifics of each of the foregoing elements are described in greater detail herein.

A system like that illustrated in FIG. 1 may include a 3-axis image sensor and a mobile digital data capture system with resident software application. Such an application may collect a variety of different types of data, including location, orientation, navigation attributes, or position at the time of image capture. Other information may concern ancillary or related support systems, networks, or hardware related to the capture system: transmission and networking protocols, particular storage or server systems, or information concerning web interfaces or access portals. The system also provides the ability to connect to specific user domains or devices allowing for collaboration in real-time while concurrently capturing remote data as might be generated in online meetings, such as whiteboards. This collaborative information is inclusive and extends to images, video, audio, and other forms of media (e.g., GIFs) as well as maps and various types of reports, including incident reports. In some embodiments, the system may be coupled to hardware such as optical readers, NFC or Bluetooth interfaces, as well as card interface readers.

Referring back to the 3-axis image sensor, such (x, y, z) technology allows for the introduction of data into the system such that image certification may be implemented thereby certifying an image. Such a sensor may also operate in conjunction with other software modules to insert, display, or permissibility manipulate the data as well as implement analytical tools to allow for utilization of the data in different market verticals. For example, certified image data could be used by the insurance industry, for surveying, with respect to farming, as well as manufacturing, security, drones, an autonomous conveyances. Law enforcement and the gaming industry could likewise utilize embodiments of the present invention.

Figure 2:
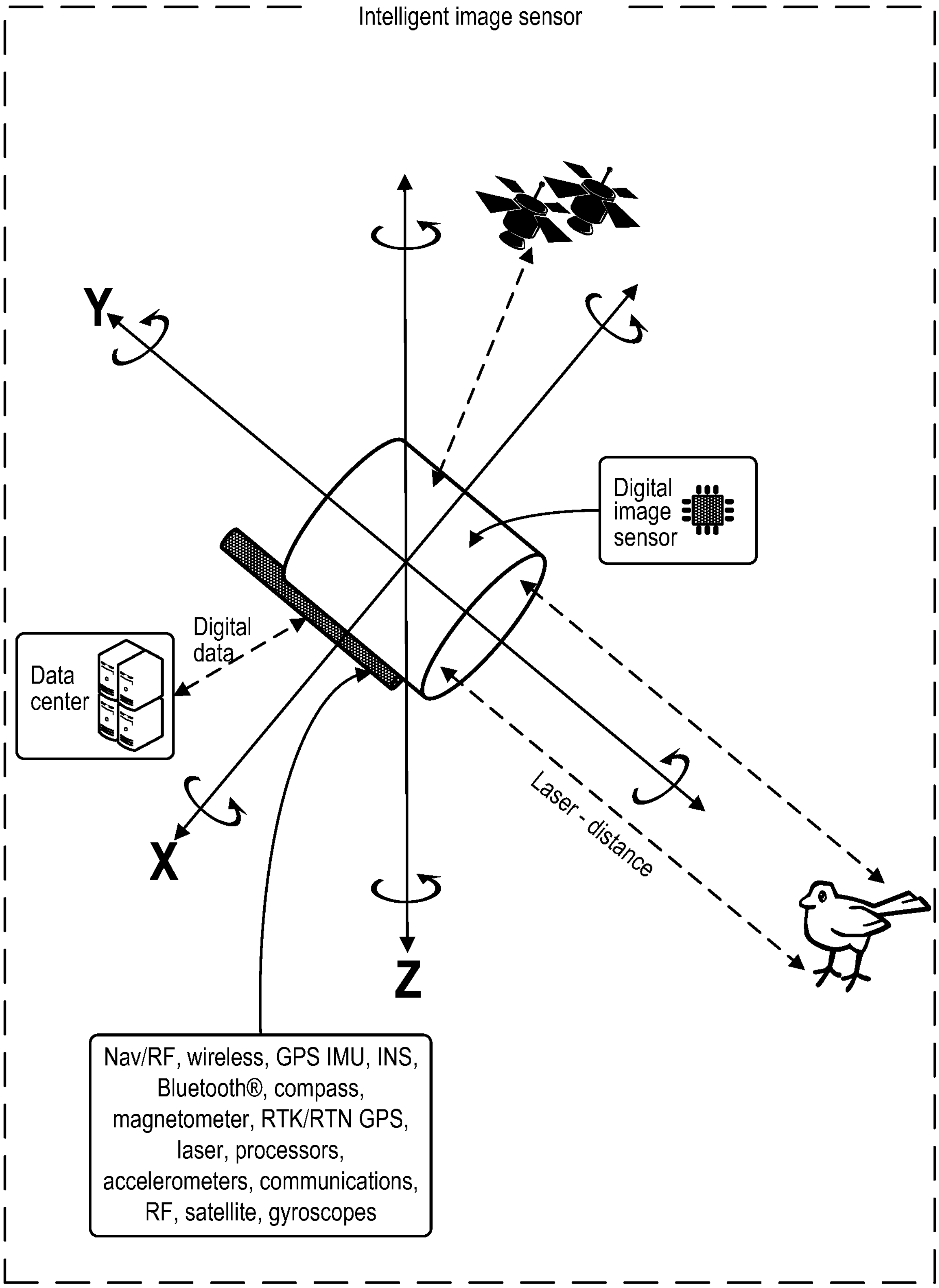
FIG. 2 illustrates an image capture system that combines a camera image with sensor data set from a sensor system.

FIG. 2 illustrates an image capture system 110 that combines a camera image with sensor data set from a sensor system. The camera image is taken using a camera embedded as a part of an image capture device. This device can be a camera such as a digital or analog point-and-shoot camera, a digital or analog single-lens reflex "SLR" camera, a digital or analog image-capturing telescope, a digital or analog image-capturing microscope, or a digital or analog camcorder. Consumer electronic devices with imaging componentry may also be used. For example, the user device can be a portable consumer user device such as a smartphone, a tablet device, a laptop computer, a wearable device, a portable gaming console, or a portable media player device. Less mobile devices may also be used such as desktop computers, television systems, gaming consoles, and various types of conveyances.

The image capture system 110 allows the user to capture images and video with greater precision and, further, to collect and gain access to metadata about the images or video. The metadata can include, for example, the exact location in latitude, longitude, and elevation of the image capture device. Captured information may further or alternatively include the roll of the image capture device, the pitch of the image capture device, the yaw of the image capture device, the velocity and/or direction of the image capture device, the viewing angle of the image capture device, the azimuth and/or compass bearing of the image capture device. Information concerning the horizon angles of the image capture device and the inclination and declination of the image capture device may likewise be collected. Such metadata can be attached to both images and video.

The digital data organization process of the image capture system 110 may be controlled manually by a user or automatically by computer hardware/software control processes. These may include organization by photos, video, audio, location, position, by image capture device, by user, by date, time, logged user, subscription user, or a number of other attributes of an image/video/audio/media file. Likewise, these images may be made searchable via these attributes in a network based (including "cloud based") storage system as well as a local storage system. In some embodiments, the captured image/video/media can also be stored and organized by facial recognition means and subsequently searched or made searchable by facial recognition applications.

Figure 3:
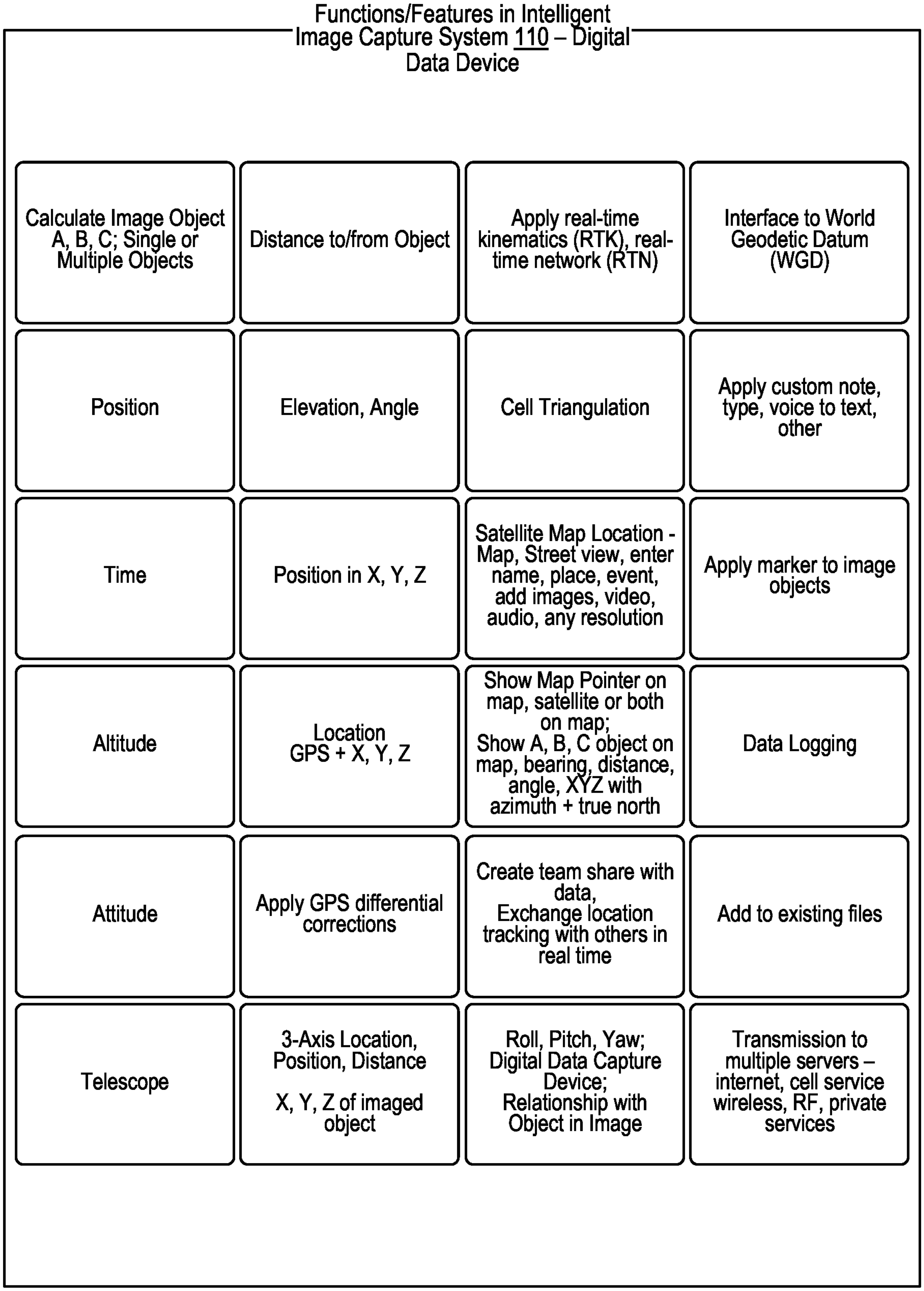
FIG. 3 illustrates exemplary functions and features of the image capture system.

FIG. 3 illustrates exemplary functions and features of the image capture system 110. The image capture system 110 may include a three-dimensional image sensor with internally embedded individual functions for providing navigation, gyroscopic, processor, and communication technology. These various functionalities, which may be implemented through software, hardware, or a combination of the two, collect incident, event, and item images with sensor data.

As noted above, such information may include but is not limited to elevation, inclination, roll, pitch, yaw and bearing information. Other types of information might include position, time, altitude, zoom/telescope information, distance to/from a pictured object, elevation angles, XYZ position, global positioning system (GPS) coordinates, GPS differential corrections, 3-axis positions of an object in the image, real-time kinematics (RTK) sensor data, real-time network (RTN) survey data, cell triangulation data, satellite map location data, street view map location data, map pointer data, map compass data, roll/pitch/yaw data, and world geodetic system (WGS) or world geodetic datum (WGD) data. This collected information may also include custom notes, text, or recordings as well as custom image markers, logged data, attachments, or pointers to additional files.

Figure 4:
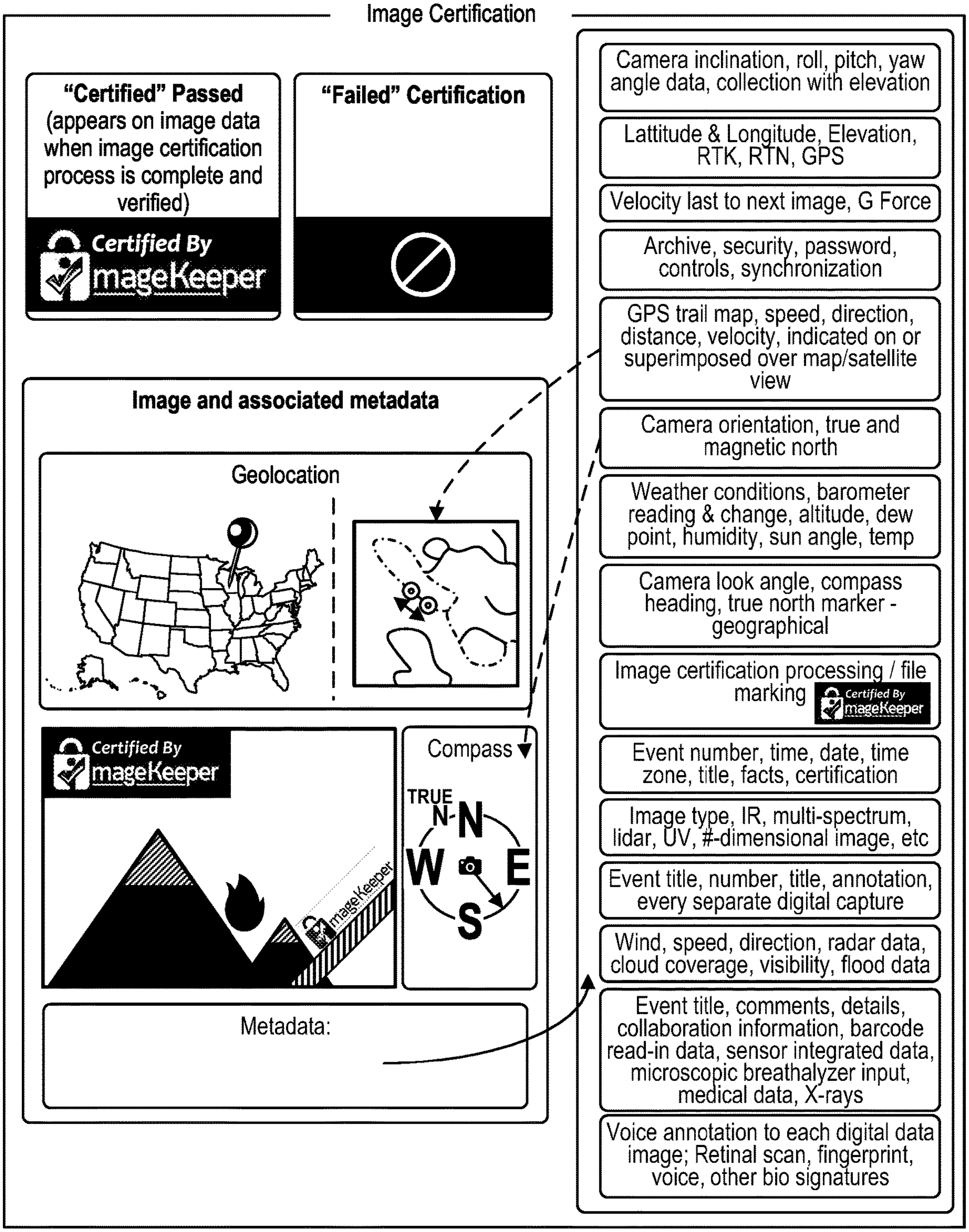
FIG. 4 identifies exemplary image metadata as may be utilized in an embodiment of the presently disclosed image certification system.

FIG. 4 identifies exemplary image metadata as may be utilized in an embodiment of the presently disclosed image certification system. The image certification system can be used to certify images and sensor data recorded by the image capture device. A certified image is one whose image data and sensor data have been ensured to be authentic and unaltered.

The image certification system can certify the image by creating a new data form that will travel with each captured image. The system can culminate data into the image data file and organize it in a visual file that is part of the image file. The data can be presented to a user through a traditional display device along with the image or can be viewed through a user control. The certification will be highlighted by certain colors and integrated with systematically collected data at time of capture and loaded into the appropriate location. A certified image can be signified as an image overlaid by a marker such as a barber pole, a "certified image" stamp, or a "certified by [image certifying authority]" stamp. FIG. 4 illustrates a barber pole logo and "certified by Image Keeper stamp."

A user seeing such a marker can be confident that an image certifying authority has certified the authenticity of the underlying digital data, video, image, and/or metadata. The image certification system may be used to ensure that digital image data is protected in an "original captured state." That state can be certified by the image capture system 110 and/or a third party auditor system. That data can then be organized and/or secured (e.g., encrypted). The image certification system may store the images in network, cloud, or local area storage system like those shown in FIG. 5. The storage system may require a subscription before a user is able to interact with the data.

Embodiments of the present invention may be extended to other third-party applications or services. For example, a user may share/post, via social networks and social media sites or mobile applications (e.g., Twitter, Facebook, Instagram, Pinterest, Myspace), a certified image/video/audio/media, in either a secure (e.g., encrypted) or unsecure format. A user may also have the ability to send certified images/media to another device/user via a messaging system (e.g., SMS, Apple iMessage, Google Hangouts, SnapChat, email, or another communication method) in a secured (e.g., encrypted) or unsecured manner.

Figure 5:
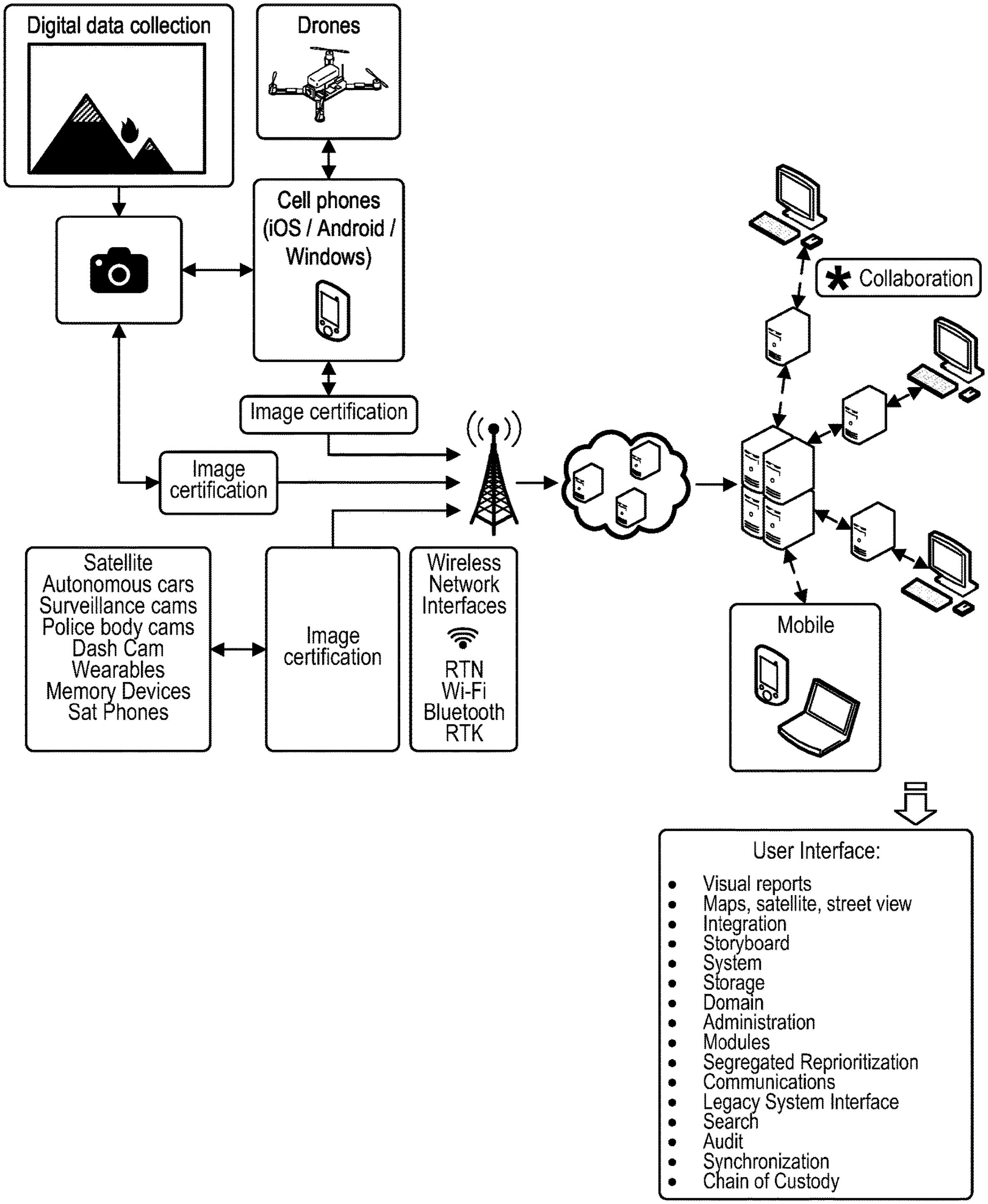
FIG. 5 illustrates an exemplary image capture system and image certification system interfacing with different types of user devices and camera devices.

FIG. 5 illustrates an exemplary image capture system 110 and image certification system 120 interfacing with different types of user devices and camera devices. The image capture device collects an image as well as sensor data (as seen on the left side of FIG. 5). The data is then autonomously sent to the internet/cloud system where the digital data is filed, stored and accessed through the web in a systematic or serialized format constant with image identification formed with the image capture device (as seen on the right side of FIG. 5). This data can be transferred over a wired or a wireless connection. In some embodiments, the image capture device can first synchronize its image and/or sensor data with a second device. For example, a camera device (e.g., a digital point-and-shoot camera) may first be required to synchronize its data with a user device such as a smartphone or wearable device, which can then form a connection to the internet/cloud system.

The internet/cloud system can include one or more server systems, which may be connected to each other. In one embodiment, this internet/cloud system is a wireless multiplexed system for securely storing digital data to and from mobile digital devices. In another embodiment, the digital data (e.g., images, reports) are securely held in one central place, either by a hardware memory device, server, or a data center.

Once the data is in the internet/cloud system, it may be accessible through a web portal. This web portal may include image-editing tools, worldwide access, and collaboration mechanisms available to its users. Security, digital signature, watermarking, encryption physical access, password credentials area can be utilized throughout the system. Original digital data can be confirmed, saved and protected though various technologies and system controls.

In some embodiments, certain data integrity precautions can be taken. For example, all non-asset data can, in some embodiments, be secured in a local database with a globally unique identifier to ensure its integrity. The asset's security and integrity can be insured via a Digital Signature that is made up of a SHA1 digest, the time that the asset was captured and the device of origin. This allows the mobile app or server to detect changes due to storage or transmission errors as well as any attempt to manipulate or change the content of the asset. The Digital Signature can be encrypted with a public/private key-pair that was generated uniquely for that asset. The private key can be destroyed and never written to disk or stored in memory; as such, this ensures that the asset cannot be re-signed or changed in a way that cannot be tracked.

Figure 6:
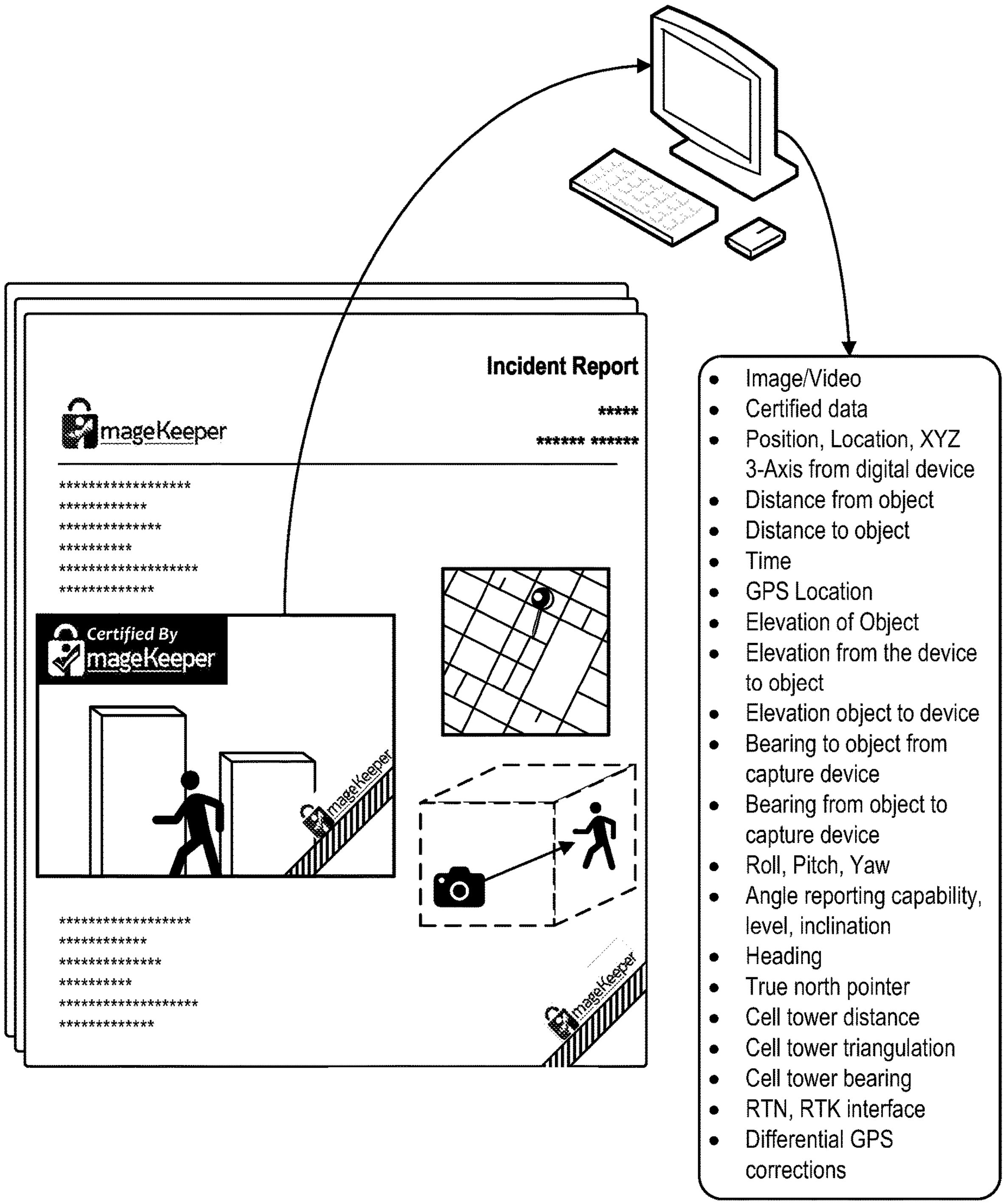
FIG. 6 illustrates an exemplary incident report document with an integrated certified image.

FIG. 6 illustrates an exemplary incident report document with an integrated certified image. The incident report document may be a digital or physical document. The incident report can include a certified photo of an incident or event along with a description of the incident or event. This description of the incident or event can include information such as an identification and/or contact information of the user who took the certified photo using the image capture device and/or who wrote the description of the incident or event, a location of the incident or event, and a brief textual or graphical description of the incident or event. The digital data organization process of the incident reporting system may be controlled manually by a user or automatically by computer hardware/software control processes.

Figure 7:
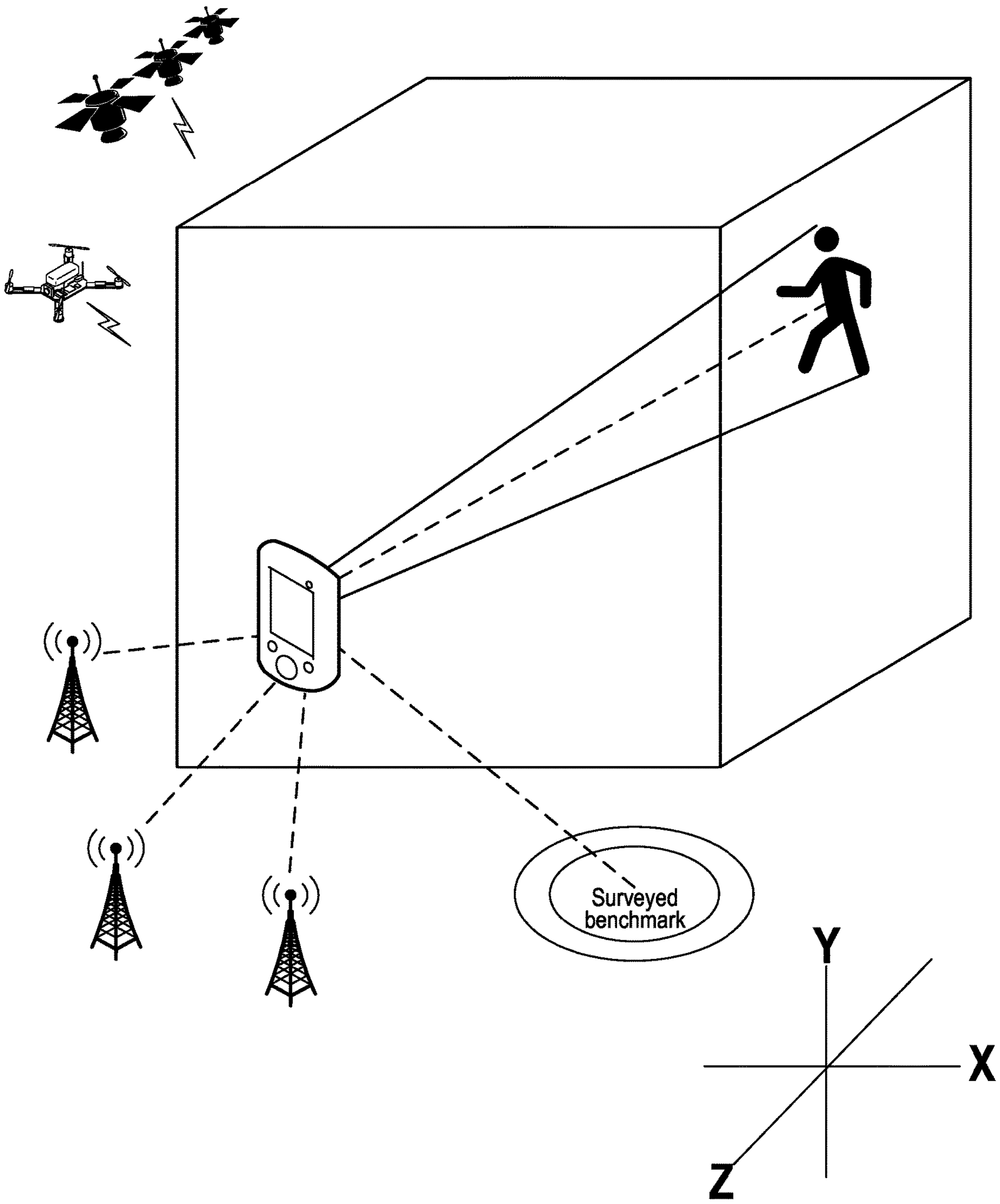
FIG. 7 further illustrates exemplary sensor data that can be included a metadata for a digital image of the image capture system.

FIG. 7 further illustrates exemplary sensor data that can be included a metadata for a digital image of the image capture system 110. For example, the sensor data may include X/Y/Z location data of the image capture device and/or object(s) being photographed. Metadata may further or alternative include data about the distance from the image capture device to an object(s) being photographed, a time stamp of the image capture, GPS data for the image capture device and/or object(s) being photographed, elevation data for the image capture device and/or object(s) being photographed, or an elevation difference between the image capture device and the object(s) being photographed. Other information might include a bearing between the image capture device and the object(s) being photographed, a roll/pitch/yaw of the image capture device, an angle between the image capture device as compared to a level sensor, an inclination of the image capture device, or a compass heading of the image capture device as compared to true north and/or magnetic north. Still further examples of data include a distance to/from a cell tower, a cell tower triangulation location, a cell tower bearing, an RTN and/or RTK interface, a differential GPS correction, and a surveyed benchmark location/distance/elevation.

FIG. 8 is a flow diagram illustrating an exemplary operation of a user device software application for image capture, image certification, network transfer, and incident reporting. While the flow diagram in FIG. 8 shows a particular order of operations performed by certain embodiments of the invention, it should be understood that such order is exemplary. Alternative embodiments can perform the operations in a different order, combine certain operations, and overlap certain operations.

FIG. 9A and FIG. 9B are flow diagrams illustrating an exemplary operation of web portal software. While the flow diagrams in FIG. 9A-B show a particular order of operations performed by certain embodiments of the invention, it should be understood that such order is exemplary. Alternative embodiments can perform the operations in a different order, combine certain operations, and overlap certain operations.

Figure 10:
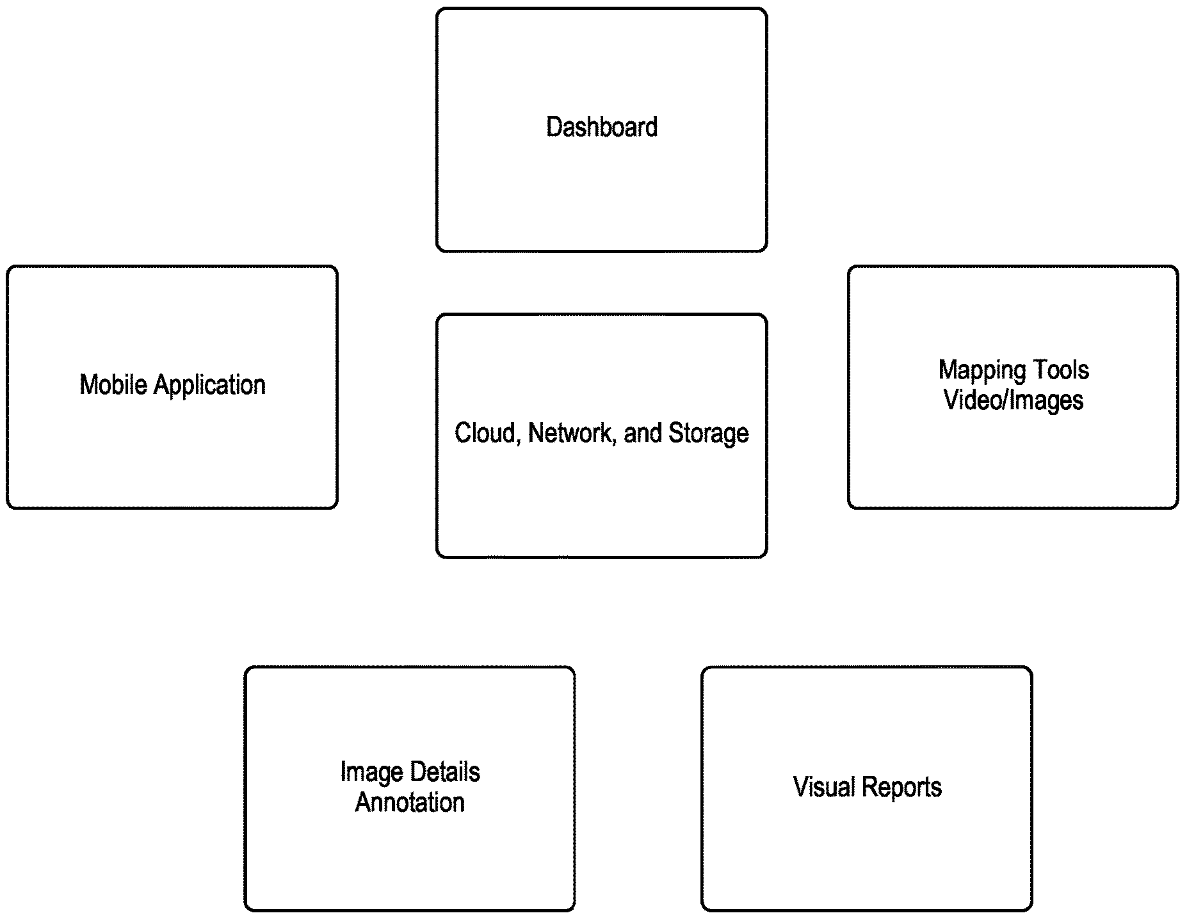
FIG. 10 illustrates various exemplary aspects of the incident reporting system.

FIG. 10 illustrates various exemplary aspects of the incident reporting system. For example, the incident reporting system may include a mobile software application for a portable user device such as a smartphone or tablet device. This mobile application may interface with the image capture system 110 and/or image certification system 120. This mobile application may interface with a network connection to the web portal, which may include a cloud/network storage module. The cloud/network storage module may be accessed in some embodiments through a dashboard interface hosted at the web portal. This may be tied to multiple interfaces for viewing images from the image capture system 110 and/or image certification system 120, and for viewing incidents associated with those images. In some embodiments, these may include image views with detail annotations, visual incident reports, and mapping tools overlaying incident report locations and/or image locations.

FIG. 11 is an exemplary incident report document with an integrated image and location map indicating where the image was taken. This is similar to the exemplary incident report document of FIG. 6.

Figure 12A:
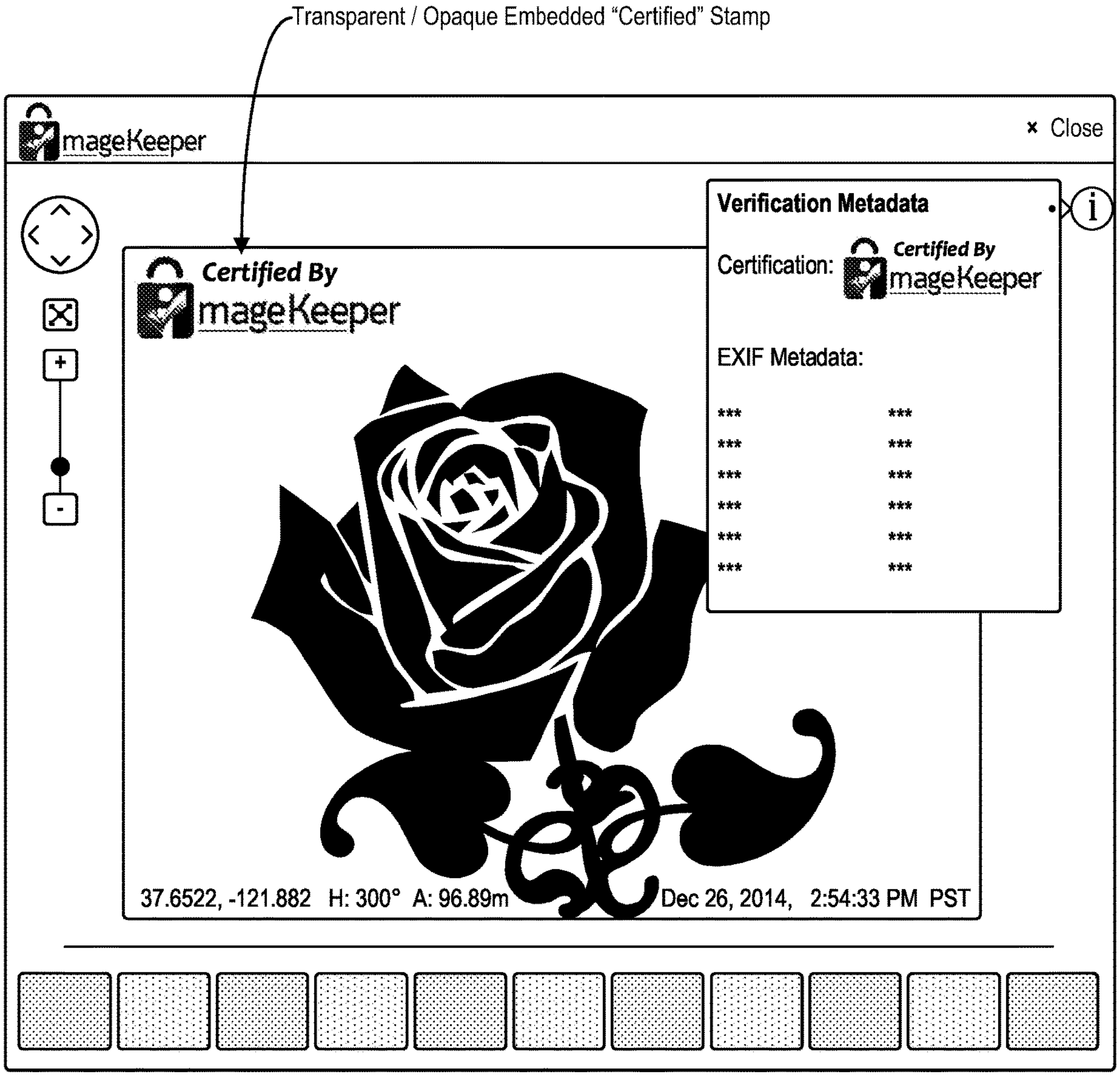
FIG. 12A illustrates an exemplary certified image within an exemplary image viewer application.

FIG. 12A illustrates an exemplary certified image within an exemplary image viewer application. The exemplary image viewer application shows a "certified image" stamp or "certified by [image certifying authority]" stamp graphic in the upper left corner, signifying that the image is a certified image. The exemplary image viewer also shows image metadata in a viewable box on the right-hand side. This metadata is also certified as part of the certification process, and may in some cases also be marked with a "certified image" stamp or "certified by [image certifying authority]" stamp graphic.

Figure 12B:
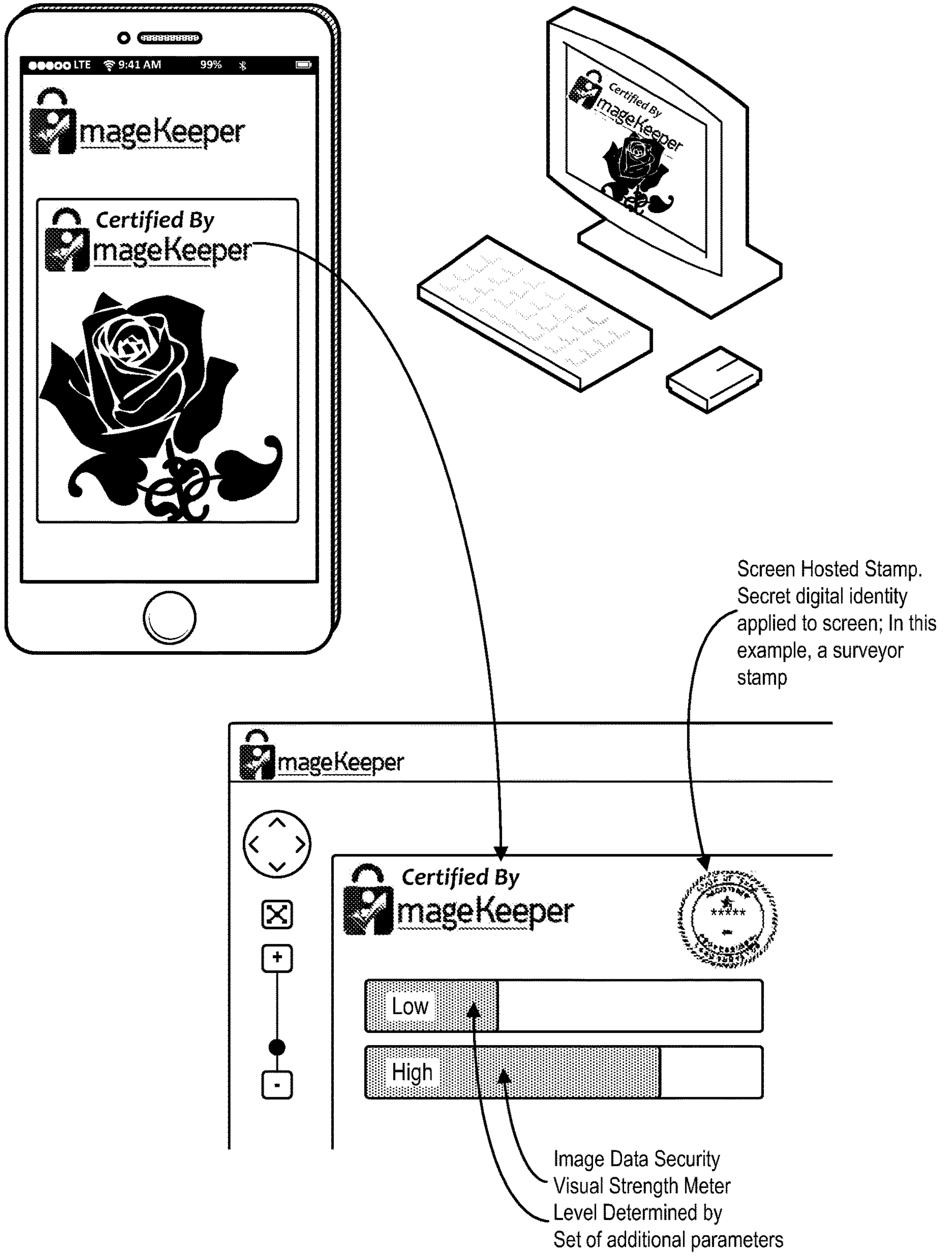
FIG. 12B is a flow diagram illustrating an exemplary operation of the intelligent image certification system.

FIG. 12B is a flow diagram illustrating an exemplary operation of the intelligent image certification system. The flow diagram includes four parts: the capture of the certified image, generation of a Copy of the certified image, the Image Security Process with an exemplary Security Meter, and the Screen Hosted Stamp.

Upon data capture, the digital watermarking and certification software processes may be applied to the digital image data as part of the image/video certifying process. A certified Image/video may be created along with the "certified image" stamp or "certified by [image certifying authority]" stamp graphic that may be embedded into or overlaid over the visual image. The certified image may be stored in a certified image file or bundle of files (e.g., a ZIP or RAR file) that includes the metadata for the image (e.g., location, direction, azimuth, sensor heading, and other potential metadata). The certified image file may then be securely transmitted and received in the web portal.

The certified image file may continue to contain all the certified data and certified image stamp/logo on the visual image as the file is accessed, used, or inserted into a report or printed etc. The certification and watermark may be configurable by graphics, by levels of security, location on the image, levels of transparency/size/holographic, and visibility. This configuration may be done automatically (e.g., based on media type, file size, device, user, etc) or manually via user control. Optionally, a user may choose to print, download, or turn additional graphics (e.g., certified image stamp) on or off.

A certified image may then synchronize or be transferred from the image capture device (e.g., camera device or user device) to the web portal server to be accessible through the web portal. This example is embedded into the image digital file and is transparent/opaque and has an accompanying logo of the user. This provides to the user a visual proof the image is true, real, accurate, unmodified without the user having to example the metadata file to manually verify, or the user attempting to verify that an image was unaltered. The process also allows users to detect image manipulation, changes, or attempts to change the original image data by researching the audit trail function of the system and to do so easily and quickly and without manual verification.

Multiple Certification Stamps based on the level of certification may be provided. For example, "a"-"z," "1"-"n," "Level a," and "chain of custody" stamps may be provided, each indicating a different level of security or a different aspect of authenticity, security, or unaltered data checked and verified by the image certification system. In addition, a user with the proper authority and license can interact with the image data, reports by applying yet a further certification stamp into the data file by applying a device authority stamp to the screen showing the certified image or document and add that certification stamp to the screen with the screen interactive stamping device and the authority seal will appear on the document in the electronic file and become part of the document or image.

While the flow diagram in FIG. 12B shows a particular order of operations performed by certain embodiments of the invention, it should be understood that such order is exemplary. Alternative embodiments can perform the operations in a different order, combine certain operations, and overlap certain operations.

Figure 13:
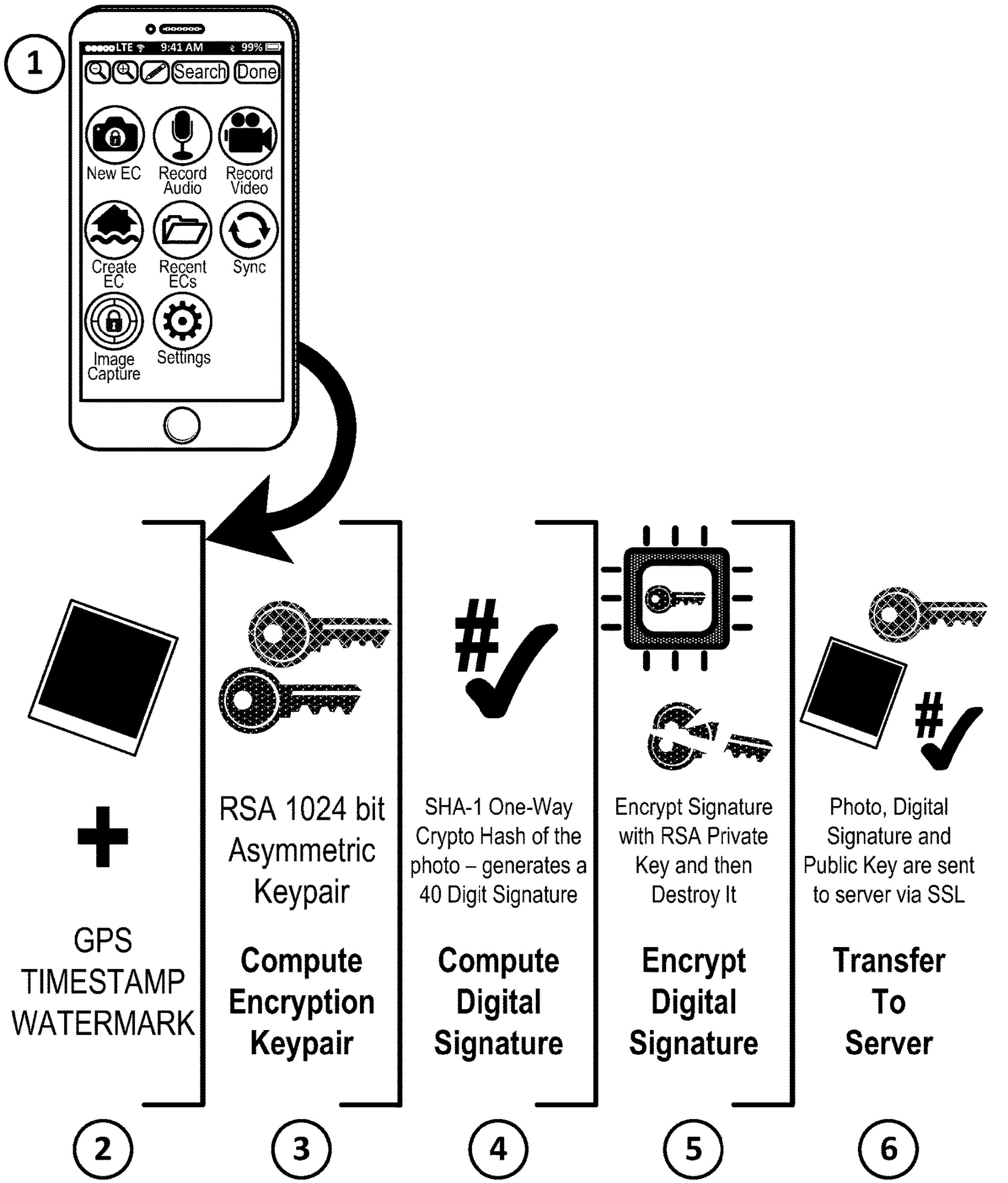
FIG. 13 illustrates an exemplary image security system as performed by the user device mobile application or by the web portal.

FIG. 13 illustrates an exemplary image security system as performed by the user device mobile application or by the web portal. FIG. 13 shows digital signature and water marked images from the image capture system, which can be used in incident reports.

The presently disclosed invention may be implemented in the general context of computer executable instructions via software located on and between a remotely operated user device (e.g., Smartphone, tablet, or other electronic device) with a computerized operating system. There may be multiple user devices interacting with a web portal, which may be local or may be geographically separated. The user devices may be remotely addressable with secure login, with or without password, biometric fingerprint, voice, retinal scan or encrypted log on web portal providing global internet access, either via fiber, radio frequency, satellite, or data linking with bi-directional, cloud system and or data center or location under user command.

The web portal and/or user device mobile application can include annotation tools, allowing for creation of charts and graphics with color annotation incorporating picture in picture, with image numbers associated with each image brought into the web portal workspace. In addition to annotation tools, any interface with all of the external data inputs, such as weather, news, Internet sites, other sensor data can be integrated into the workspace and integrated into the image work areas.

In one embodiment, report generation is available in the web portal tool workspace. Along with the report development is internal electronic signature and annotation, with the ability to add images, text to document, voice to text, language conversion, spelling corrections, assigning a number to the report, with associated event/incident number along with all the images captured for the specific event/incident and other associated data. All of this data is captured by the web portal software application and integrated into the report either with the user commands or pre-established data could be added or selected either by the user or by the software program. The reports can be saved in many computer formats, and can be SMS, Emailed, Printed, Filed or stored on line or off line as required by the user or pre-selected choices made either by the user or the software.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for generating certified media, the method comprising:

receiving, from a media capture device, a digital media asset captured by the media capture device;

receiving a sensor dataset captured by one or more sensors, the sensor dataset associated with a capture of the digital media asset;

retrieving metadata from the digital media asset, the metadata identifying at least the media capture device and a time associated with the capture of the digital media asset, generating a hash of the digital media asset;

encrypting the hash, the metadata, and the sensor dataset using a private key to generate an encrypted digital signature, wherein a key pair includes the private key and a public key;

combining the digital media asset with the encrypted digital signature to generate a certified media dataset; and transmitting the certified media dataset and the public key to at least one network server.

2. The method of claim 1, wherein the sensor dataset includes at least one of location data or elevation data.

3. The method of claim 1, wherein the sensor dataset includes orientation data identifying at least one of a pitch, a yaw, or a roll.

4. The method of claim 1, wherein the sensor dataset includes at least distance measurement data measuring a distance to an object represented in the digital media asset.

5. The method of claim 1, wherein the digital media asset includes at least one of image data, audio data, or video data.

6. The method of claim 1, further comprising:

destroying the private key after generating the encrypted digital signature.

7. The method of claim 1, wherein generating the hash of the digital media asset includes generating the hash using a secure hash algorithm (SHA).

8. The method of claim 1, further comprising:

verifying that the digital media asset and the metadata are unaltered based on the encrypted digital signature.

9. The method of claim 1, further comprising:

encrypting the digital media asset, wherein the digital media asset is encrypted as combined in the certified media dataset.

10. The method of claim 1, wherein the certified media dataset identifies a chain of custody of the digital media asset.

11. The method of claim 1, further comprising:

transmitting a description of an incident associated with the digital media asset to the at least one network server.

12. The method of claim 11, further comprising:

receiving spoken audio; and converting the spoken audio to text to generate the description of the incident.

13. The method of claim 1, further comprising:

generating the key pair.

14. The method of claim 1, wherein generating the certified media dataset includes incorporating at least one of a watermark or a stamp into the digital media asset.

15. The method of claim 1, further comprising:

receiving a second certified media dataset from the at least one network server during a data synchronization, and transmitting the certified media dataset and the public key to the at least one network server during the data synchronization.

16. A system for generating certified media, the system comprising:

a memory that stores instructions; and a processor coupled to the memory, wherein execution of the instructions by the processor causes the processor to:

receive a digital media asset captured by a media capture device, receive a sensor dataset captured by one or more sensors, the sensor dataset associated with a capture of the digital media asset, retrieve metadata from the digital media asset, the metadata identifying at least the media capture device and a time associated with the capture of the digital media asset, generate a hash of the digital media asset, encrypt the hash, the metadata, and the sensor dataset using a private key to generate an encrypted digital signature, wherein a key pair includes the private key and a public key, combine the digital media asset with the encrypted digital signature to generate a certified media dataset, and transmit the certified media dataset and the public key to at least one network server.

17. The system of claim 16, wherein the one or more sensors include an elevation sensor and the sensor dataset includes elevation data.

18. The system of claim 16, wherein the digital media asset includes at least one of image data, audio data, or video data.

19. The system of claim 16, wherein the execution of the instructions by the processor causes the processor to:

destroy the private key after generating the encrypted digital signature.

20. The system of claim 16, wherein generating the hash of the digital media asset includes generating the hash using a secure hash algorithm (SHA).

21. The system of claim 16, wherein the execution of the instructions by the processor causes the processor to:

encrypt the digital media asset, wherein the digital media asset is encrypted as combined in the certified media dataset.

22. The system of claim 16, wherein the execution of the instructions by the processor causes the processor to:

transmit a description of an incident associated with the digital media asset to the at least one network server.

23. A non-transitory computer-readable storage medium, having embodied thereon a program executable by a processor to perform a method for generating certified media, the method comprising:

receiving, from a media capture device, a digital media asset captured by the media capture device;

receiving a sensor dataset captured by one or more sensors, the sensor dataset associated with a capture of the digital media asset;

retrieving metadata from the digital media asset, the metadata identifying at least the media capture device and a time associated with the capture of the digital media asset;

generating a hash of the digital media asset;

encrypting the hash, the metadata, and the sensor dataset using a private key to generate an encrypted digital signature, wherein a key pair includes the private key and a public key;

combining the digital media asset with the encrypted digital signature to generate a certified media dataset; and transmitting the certified media dataset and the public key to at least one network server.

24. The non-transitory computer-readable storage medium of claim 23, the method further comprising:

receiving a description of an incident associated with the digital media asset; and transmitting the description of the incident to the at least one network server.

* * * * *